US010033585B2

(12) United States Patent
Vohra et al.

(10) Patent No.: US 10,033,585 B2
(45) Date of Patent: Jul. 24, 2018

(54) METHODS AND APPARATUS RELATED TO A SWITCH FABRIC SYSTEM HAVING A MULTI-HOP DISTRIBUTED CONTROL PLANE AND A SINGLE-HOP DATA PLANE

(75) Inventors: Quaizar Vohra, Santa Clara, CA (US); Umesh Kondur, Union City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 12/968,957

(22) Filed: Dec. 15, 2010

(65) Prior Publication Data

US 2012/0155453 A1    Jun. 21, 2012

(51) Int. Cl.
*H04L 12/24* (2006.01)
*H04L 12/801* (2013.01)
*H04L 12/947* (2013.01)

(52) U.S. Cl.
CPC .......... *H04L 41/0823* (2013.01); *H04L 47/13* (2013.01); *H04L 47/17* (2013.01); *H04L 49/25* (2013.01)

(58) Field of Classification Search
CPC ..... H04L 41/0823; H04L 47/13; H04L 47/17; H04L 49/25
USPC ........................................ 370/254, 466, 352
See application file for complete search history.

(56) References Cited

U.S. PATENT DOCUMENTS

| | | | |
|---|---|---|---|
| 7,315,985 B1 * | 1/2008 | Gauvin et al. | 715/734 |
| 7,804,769 B1 * | 9/2010 | Tuplur | H04L 45/00 370/218 |
| 7,835,357 B2 | 11/2010 | Panwar et al. | |
| 7,864,700 B2 * | 1/2011 | Shepard et al. | 370/254 |
| 2003/0039212 A1 | 2/2003 | Lloyd et al. | |
| 2006/0092975 A1 | 5/2006 | Ansari et al. | |
| 2006/0177066 A1 * | 8/2006 | Han et al. | 380/277 |
| 2007/0115918 A1 | 5/2007 | Bodin et al. | |
| 2007/0258467 A1 * | 11/2007 | Bourne | 370/400 |
| 2008/0031151 A1 | 2/2008 | Williams | |
| 2009/0304010 A1 * | 12/2009 | Kurebayashi et al. | 370/401 |

(Continued)

FOREIGN PATENT DOCUMENTS

EP        2 466 825        6/2012

OTHER PUBLICATIONS

Extended Search Report for European Application No. 11192575.7, dated Mar. 30, 2012, 6 pages.

(Continued)

*Primary Examiner* — Khaled Kassim
(74) *Attorney, Agent, or Firm* — Cooley, LLP

(57) ABSTRACT

In some embodiments, an apparatus includes a compute device to communicate with a network control entity at each access switch from a set of access switches that define a portion of a data plane having a switch fabric coupling as hierarchical peers each access switch from the set of access switches. The compute device is operable to define a portion of a control plane that includes the network control entities from the set of access switches such that the compute device is hierarchically removed from the network control entities from the set of access switches. The compute device is operable to receive forwarding-state information from a first access switch from the set of access switches. The compute device to send the forwarding-state information to a second access switch from the set of access switches.

14 Claims, 6 Drawing Sheets

(56) References Cited

U.S. PATENT DOCUMENTS

| | | | |
|---|---|---|---|
| 2010/0039932 A1* | 2/2010 | Wen | H04L 41/044 370/217 |
| 2010/0061394 A1 | 3/2010 | Sindhu et al. | |
| 2010/0083345 A1 | 4/2010 | Panwar et al. | |
| 2010/0165983 A1 | 7/2010 | Aybay et al. | |
| 2010/0265832 A1 | 10/2010 | Bajpay et al. | |
| 2011/0103389 A1* | 5/2011 | Kidambi et al. | 370/395.1 |
| 2012/0155320 A1 | 6/2012 | Vohra et al. | |
| 2013/0070910 A1 | 3/2013 | O'Sullivan | |

OTHER PUBLICATIONS

Wikipedia "Internet Protocol Suite" [online], Retrieved from the Internet <URL: http://en.wikipedia.org/wiki/Internet_Protocol_Suite>, on Jul. 19, 2010, 8 pgs.

Chinese Office Action dated Jun. 15, 2015 for Chinese Application No. 201110272108.2.

Chinese Office Action dated Apr. 1, 2014 for Chinese Application No. 201110272108.2.

Chinese Office Action dated Dec. 8, 2014 for Chinese Application No. 201110272108.2.

\* cited by examiner

METHODS AND APPARATUS RELATED TO A SWITCH FABRIC SYSTEM HAVING A MULTI-HOP DISTRIBUTED CONTROL PLANE AND A SINGLE-HOP DATA PLANE

BACKGROUND

Some embodiments described herein relate generally to switch fabric systems, and, in particular, to a distributed control plane of a switch fabric system.

Some known networking systems include a centralized control plane that can manage resources of the networking system. For example, the centralized control plane can maintain a database associated with the physical location of the resources (e.g., chassis identifier, chassis shelf identifier). Additionally, the centralized control plane can manage forwarding-state information associated with the resources. Such a centralized control plane, however, can become extremely large and unmanageable when a large number of resources are included within the networking system.

Other known networking systems include a distributed control plane. Such known distributed control planes can be implemented at various nodes within the networking system. In some known networking systems, forwarding-state information is manually configured at each node implementing a portion of the control plane. Such known networking systems, however, are not suitable for large scale networking systems having a large number of nodes implementing a portion of the control plane. For example, an operator would need to manually enter each update and/or change to the topology of such a networking system at each node implementing a portion of the control plane. This can become cumbersome when frequent updates are made to a large scale networking system.

Accordingly, a need exists for apparatus and methods to efficiently manage, transport and/or share forwarding-state information within a distributed control plane.

SUMMARY OF THE INVENTION

In some embodiments, an apparatus includes a compute device to communicate with a network control entity at each access switch from a set of access switches that define a portion of a data plane having a switch fabric coupling as hierarchical peers each access switch from the set of access switches. The compute device is operable to define a portion of a control plane that includes the network control entities from the set of access switches such that the compute device is hierarchically removed from the network control entities from the set of access switches. The compute device is operable to receive forwarding-state information from a first access switch from the set of access switches. The compute device to send the forwarding-state information to a second access switch from the set of access switches.

DETAILED DESCRIPTION

Figure 1:
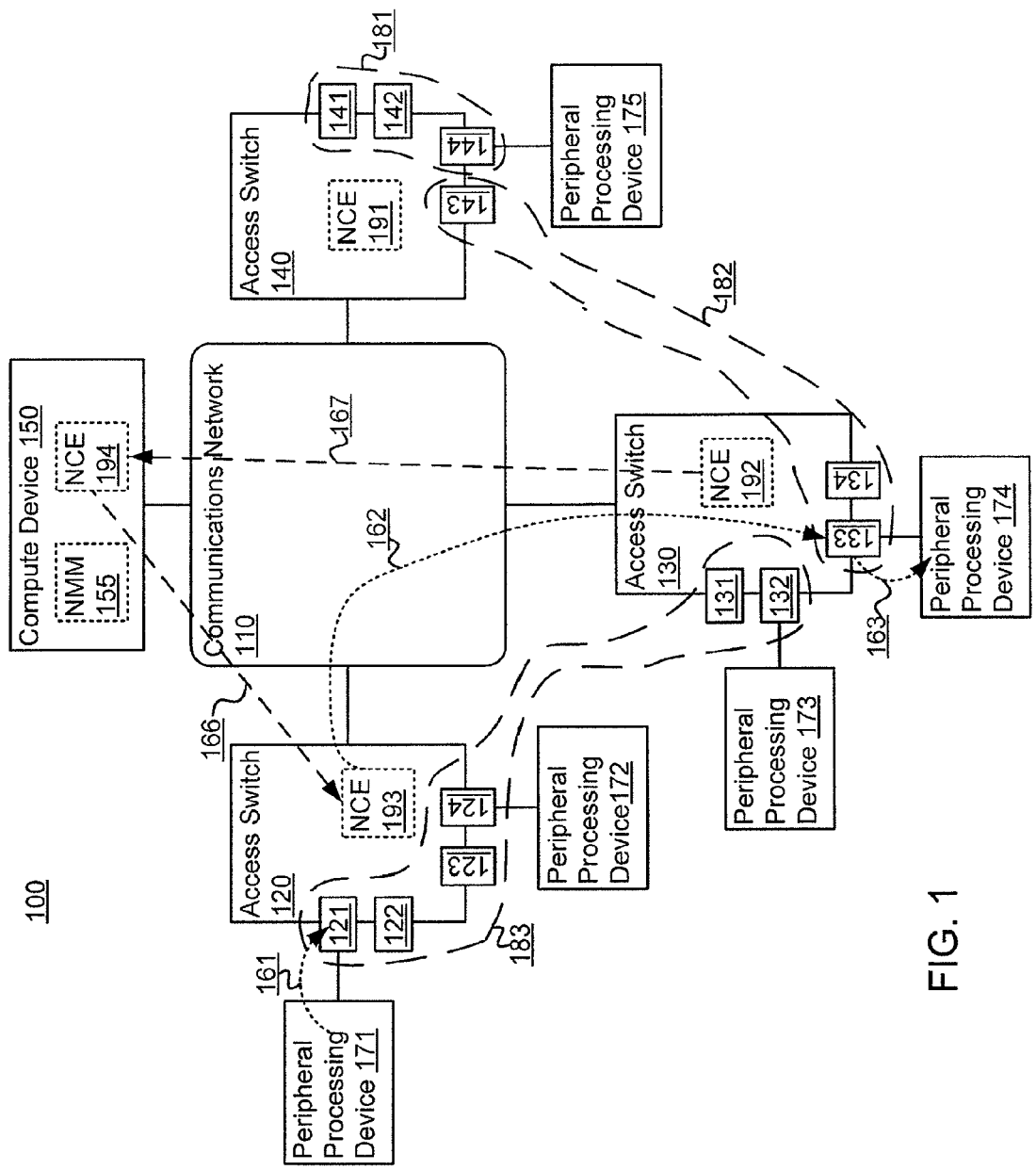
FIG. 1 is a schematic illustration of a switch fabric system, according to an embodiment.

In some embodiments, an apparatus includes a compute device to communicate with a network control entity at each access switch from a set of access switches that define a portion of a data plane having a switch fabric coupling as hierarchical peers each access switch from the set of access switches. The compute device is operable to define a portion of a control plane that includes the network control entities from the set of access switches such that the compute device is hierarchically removed from the network control entities from the set of access switches. The compute device is operable to receive forwarding-state information from a first access switch from the set of access switches. The compute device to send the forwarding-state information to a second access switch from the set of access switches.

In such embodiments, the data plane can be said to be flat while the control plane can be said to be hierarchical. Similarly stated, each access switch can send data to the remaining access switches without passing through a node, module and/or device that is hierarchically removed from the access switches (e.g., at a different hierarchical level). Additionally, each network control entity at the access switches can send forwarding-state information to the other access switches via a control plane including the compute device hierarchically removed from the network control entities. Similarly stated, the compute device can function and/or operate as a route reflector between the network control entities at the access switches.

In some embodiments, an apparatus includes a control plane device to communicate via a control plane with each access switch from a set of access switches coupled together as hierarchical peers by a switch fabric defining a single logical hop within a data plane. The control plane device to receive forwarding-state information from a first access switch from the set of access switches via a first logical hop. The compute device to send the forwarding-state information to a second access switch from the set of access switches via a second logical hop.

In such embodiments, the data plane can be said to include a single logical hop while the control plane can be said to include multiple logical hops. Similarly stated, from a perspective of a packet-based protocol (e.g., Ethernet, Fibre Channel), the control plane includes multiple logical hops while the data plane includes a single logical hop. Said another way, an access switch can send a data packet to another access switch via a single logical hop within the data plane while sending a control packet to another access switch via multiple logical hops within the control plane.

In some embodiments, at least a portion of a switch fabric system includes a data plane and a control plane. The data plane includes a set of access switches and a switch fabric operatively coupling as hierarchical peers each access switch from the set of access switches. A first access switch from the set of access switches can send data to a second access switch from the set of access switches using a first protocol. The switch fabric operable to use the first protocol to route the data from the first access switch to the second access switch. The control plane includes a network control entity at the first access switch from the set of access switches and a network control entity at the second access switch from the set of access switches. The network control entity at the first access switch can send forwarding-state information to the network control entity at the second access switch using a second protocol different from the first protocol.

In such embodiments, the switch fabric system uses different protocols for the data plane and the control plane. In some embodiments, for example, the data plane can use a cell-based protocol while the control plane can use a packet-based protocol. Using different protocols within the data plane and control plane allows the switch fabric system to improve the transfer of data signals within the data plane and control signals within the control plane. For example, the data plane can be defined to transmit large amounts of data while the control plane can be separately defined to transmit forwarding-state information associated with the switch fabric system.

Embodiments shown and described herein refer to multiple communication layers (e.g., data link layer (layer-2), network layer (layer-3), physical layer (layer-1), application layer (layer-7), etc.). Such communication layers can be defined by the open systems interconnection (OSI) model. Accordingly, the physical layer can be a lower level layer than the data link layer. Additionally, the data link layer can be a lower level layer than the network layer and the application layer. Further, different protocols can be associated with and/or implemented at different layers within the OSI model. For example, an Ethernet protocol, a Fibre Channel protocol and/or a cell based protocol (e.g., used within a data plane portion of a communications network) can be associated with and/or implemented at a data link layer, and a Border Gateway Protocol (BGP) can be associated with and/or implemented at a higher layer, such as, for example, an application layer. Although BGP can be implemented at the application layer, it can be used to send forwarding-state information (e.g., port identifiers, network segment identifiers, peripheral processing device identifiers, etc.) used to populate a routing table associated with a network layer and/or data link layer.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules and/or devices in a system. Similarly stated, a single physical hop can include, for example, a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol (e.g., a first data link layer protocol). Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol (e.g., a second data link layer protocol) can use the destination address of the first protocol (e.g., the first data link layer protocol) to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated layer-2 (L2)/layer-3 (L3) switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, each stage within a switch fabric can be connect to adjacent stage(s) by physical links while operating collectively as a single logical hop associated with a protocol used to route data outside the switch fabric. Additionally, packet classification and forwarding associated with a protocol (e.g., Ethernet) used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a module" is intended to mean a single module or a combination of modules.

FIG. 1 is a schematic diagram that illustrates a switch fabric system 100, according to an embodiment. The switch fabric system 100 includes a communications network 110, multiple access switches 120, 130, 140, a compute device 150 and multiple peripheral processing devices 171-175. The peripheral processing devices 171-175 are operatively coupled to each other by remaining portions of the switch fabric system 100. The peripheral processing devices 171-175 can be, for example, compute nodes, service nodes, routers, and storage nodes, as described in further detail herein. In some embodiments, for example, the peripheral processing devices 171-175 include servers, storage devices, gateways, workstations, and/or the like.

The peripheral processing devices 171-175 can be operatively coupled to one or more ports 121-124, 131-134, 141-144 of the access switches 120, 130, 140, respectively, using any suitable connection such as, for example, an optical connection (e.g., an optical cable and optical connectors), an electrical connection (e.g., an electrical cable and electrical connectors) and/or the like. Similarly stated, each port 121-124, 131-134, 141-144 provides a communication interface through which a peripheral processing device 171-175 can be operatively coupled to an access switch 120, 130, 140, as described in further detail herein. As such, the peripheral processing devices 171-175 can send data (e.g., data packets, data cells, etc.) to and receive data from the access switches 120, 130, 140. In some embodiments, the connection between the peripheral processing devices 171-175 and the access switches 120, 130, 140 is a direct link. Such a link can be said to be a single physical hop link. In other embodiments, the peripheral processing devices can be operatively coupled to the access switches via intermediate modules. Such a connection can be said to be a multiple physical hop link.

Each access switch 120, 130, 140 can be any device that operatively couples a peripheral processing device 171-175 to the communications network 110. In some embodiments, for example, the access switches 120, 130, 140 can be edge devices, input/output modules, top-of-rack devices and/or the like. Structurally, the access switches 120, 130, 140 can function as both source access switches and destination access switches. Accordingly, the access switches 120, 130, 140 can send data (e.g., a data stream of data packets and/or data cells) to and receive data from the communications network 110, and to and from the connected peripheral processing devices 171-175.

Each of the access switches 120, 130, 140 is operable to communicate with the other access switches 120, 130, 140 via the communications network 110 (e.g., within both a control plane portion and data plane portion). Specifically, the data plane portion of the communications network 110 provides any-to-any connectivity between the access switches 120, 130, 140 at relatively low latency. For example, the data plane portion of the communications network 110 can transmit (e.g., convey) data between access switches 120, 130, 140. In some embodiments, the access switches 120, 130, 140 can be said to be hierarchical peers with and/or on a same hierarchical level as the other access switches 120, 130, 140 within the switch fabric system 100. As such, one access switch 120, 130, 140 does not control and/or manage another access switch 120, 130, 140. Additionally, an access switch 120, 130, 140 does not send data to another access switch 120, 130, 140 through a higher level entity. Accordingly, the data plane of the switch fabric system 100 can be said to be flat. As described in further detail herein, in some embodiments, the communications network 110 can have at least hundreds or thousands of ports (e.g., egress ports and/or ingress ports) through which access switches 120, 130, 140 can transmit and/or receive data.

Figure 2:
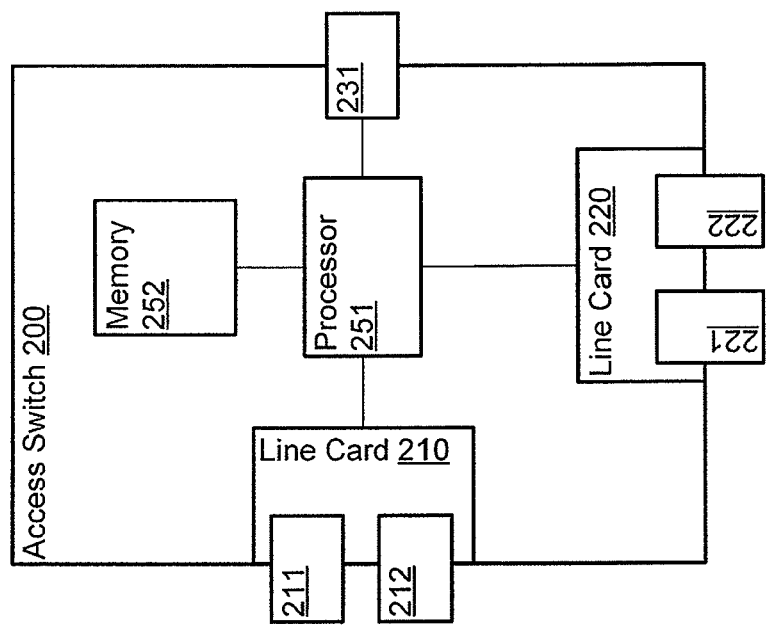
FIG. 2 is a schematic illustration of an access switch of a switch fabric system, according to another embodiment.

FIG. 2 is a system block diagram of an access switch 200 similar to the access switches 120, 130, 140. The access switch 200 includes processor 251, memory 252, line card 210, line card 220, and port 231. Processor 251 is operatively coupled to memory 252, line card 210, line card 220 and port 231. Line card 210 includes ports 211 and 212. Line card 220 includes ports 221 and 222. In some embodiments, line cards 210 and/or 220 include one or more processors and/or memories (not shown).

Similar to the ports 121-124, 131-134, 141-144 of the access switches 120, 130, 140 shown in FIG. 1, ports 211, 212, 221 and 222 can communicate with peripheral processing devices. For example, ports 211, 212, 221 and 222 can implement a physical layer using twisted-pair electrical signaling via electrical cables or fiber-optic signaling via fiber-optic cables. In some embodiments, some of ports 211, 212, 221 and 222 implement one physical layer such as twisted-pair electrical signaling and others of ports 211, 212, 221 and 222 implement a different physical layer such as fiber-optic signaling. Furthermore, ports 211, 212, 221 and 222 can allow access switch 200 to communicate with peripheral processing devices, such as, for example, computer servers (servers), via a common protocol such as Ethernet or Fibre Channel. In some embodiments, some of ports 211, 212, 221 and 222 implement one protocol such as Ethernet and others of ports 211, 212, 221 and 222 implement a different protocol such as Fibre Channel. Thus, access switch 200 can be in communication with multiple peripheral processing devices using homogeneous or heterogeneous physical layers and/or protocols via ports 211, 212, 221 and 222.

Port 231 can be in communication with other access switches via a communications network such as a switch fabric (e.g., data plane portion of communications network 110). Port 231 can be part of one or more network interfaces (e.g., a 40 Gigabit (Gb) Ethernet interface, a 100 Gb Ethernet interface, etc.) through which the access switch 200 can send signals to and/or receive signals from a communications network. The signals can be sent to and/or received from the communications network via an electrical link, an optical link and/or a wireless link operatively coupled to the access switch 200. In some embodiments, the access switch 200 can send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, port 231 can implement a different physical layer and/or data link layer protocol than those implemented at ports 211, 212, 221 and 222. For example, port 211, 212, 221 and 222 can communicate with peripheral processing devices using a protocol based on data packets (e.g., a packet-based protocol such as Ethernet) and port 231 can communicate via a data plane portion of a communications network (e.g., a switch fabric) using a protocol based on data cells (e.g., a cell-based protocol). In such embodiments and as described in further detail herein, the access switch 200 can receive a data packet from a peripheral processing device (e.g., using a packet-based protocol) via a port 211, 212, 221, 222 and divide and/or partition the data packet into data cells. After the data packet is divided and/or partitioned into data cells, the access switch 200 can send the data cells to a data plane portion of a communications network via port 231. Similarly stated, in such embodiments, access switch 200 can convert and/or modify data from a packet-based protocol to a cell-based protocol prior to sending the data to the communications network. Said differently, access switch 200 can be an edge device of a switch fabric such as a distributed switch fabric.

In some embodiments, the access switch 200 can prepare a data packet (e.g., an Ethernet frame and/or packet) to enter a data plane portion of a communications network (e.g., communications network 110). For example, the access switch 200 can forward, classify, and/or modify the packet encapsulation (e.g., modify, add and/or remove a header portion, footer portion and/or any other identifier included within the data packet) of a data packet prior to sending the data packet to the data plane portion of the communications network. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Returning to FIG. 1, and as described in further detail herein, the access switches 120, 130, 140 can host network control entities 191-193 to manage the ports 121-124, 131-134, 141-144 of the access switches 120, 130, 140. Accordingly, the network control entities 191-193 can be part of a control plane of the switch fabric system 100. Each network control entity 191-193 can be a process, application, virtual machine, and/or some other software module (executing in hardware) or a hardware module executed at an access switch 120, 130, 140 or a compute device 150. As such, instructions that implement the network control entities 191-193 can be stored within a memory of an access switch 120, 130, 140 (e.g., memory 252) and executed at a processor of an access switch 120, 130, 140 (e.g., processor 251). In some embodiments, and as described in further detail herein, the network control entities 191-193 can be said to be at the lowest hierarchical level of the control plane of the switch fabric system 100 as they directly manage the ports 121-124, 131-134, 141-144.

For example, network control entity 191 is operable to manage the ports 141, 142, 144 associated with the group of ports 181; network control entity 192 is operable to manage the ports 133, 134, 143 associated with the group of ports 182; and network control entity 193 is operable to manage the ports 121, 122, 123, 124, 131, 132 associated with the group of ports 183. In some embodiments, each network control entity 191-193 can manage and/or maintain configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with its respective group of ports 181, 182, 183, monitor a state and/or status of peripheral processing devices associated with its respective group of ports 181, 182, 183, and/or manage and maintain other information associated with the peripheral processing devices and/or ports associated with its respective group of ports 181, 182, 183.

In some embodiments, a network control entity can control and/or manage ports at an access switch at which the network control entity is located (e.g., network control entity 191 manages the group of ports 181). In other embodiments, a network control entity can also control and/or manage ports at an access switch other than the access switch at which the network control entity is located (e.g., network control entity 193 manages ports 131 and 132, and network control entity 192 manages port 143). In such embodiments, the network management module 155 has flexibility to assign each port 121-124, 131-134, 141-144 to a network control entity 191-193 based on processing capacity. Additionally, in such embodiments, the network management module 155 is not constrained by the physical location of the network control entities 191-193 and/or the ports 121-124, 131-134, 141-144 when assigning the ports 121-124, 131-134, 141-144 to a network control entity 191-193.

The compute device 150 can host management modules, processes and/or functions associated with the switch fabric system 100. As shown in FIG. 1, the compute device 150 can host a network management module 155 and a network control entity 194. The network management module 155 and the network control entity 194 can be part of the control plane of the switch fabric system 100.

The network control entity 194 can function as a route reflector between the other network control entities 191-193. Similarly stated, the network control entity 194 can function as an intermediary network control entity between the network control entities 191-193 at the access switches 120, 130, 140. In some embodiments, the network control entity 194 can be said to be hierarchically removed (e.g., at a different hierarchical level) from the network control entities 191-193. For example, the network control entity 194 can be said to be on a higher level in the control plane of the switch fabric system 100 than the network control entities 191-193.

Figure 4:
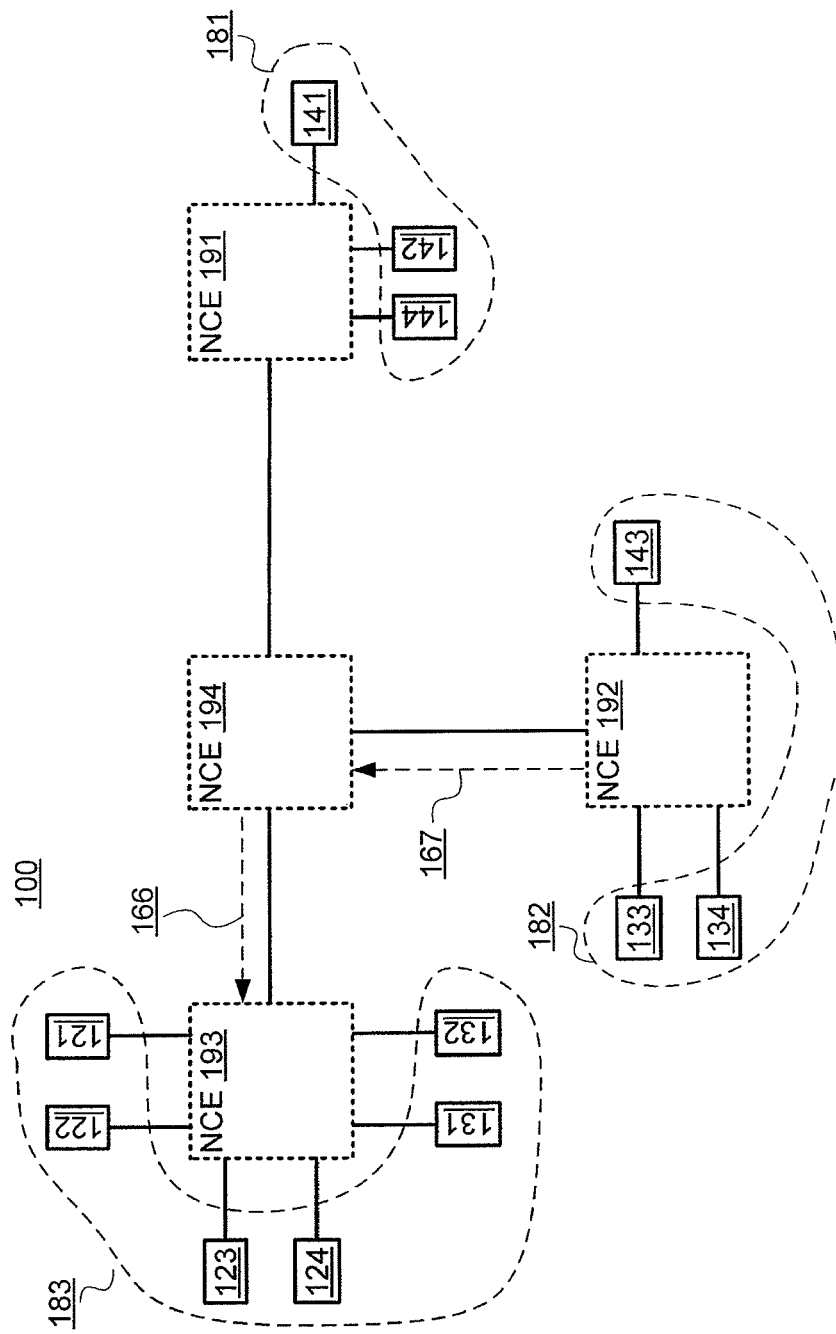
FIG. 4 is a logical representation of a control plane of the switch fabric system of FIG. 1.

FIG. 4, for example, is a block diagram of a logical topology of the control plane of the switch fabric system 100, shown in FIG. 1. As shown in FIG. 4, in the control plane, the network control entities 191-193 are operatively coupled to each other through the network control entity 194. As shown in FIG. 1, and as described in further detail herein, such a connection can be through a control plane portion of the communications network 110.

The network control entities 191-193 can send forwarding-state information (e.g., using a control signal) to each other via the network control entity 194 (i.e., via a network control entity hierarchically removed from the network control entities 191-193). For example, as described in further detail herein, network control entity 192 can send forwarding-state information associated with the group of ports 182 to the network control entity 193 via the network control entity 194 (e.g., shown as path 167 and path 166). In such an example, the path between the network control entity 192 and the network control entity 193 can be said to include two physical hops as well as two logical hops. More specifically, the path between the network control entity 192 and the network control entity 194 defines a single physical hop and a single logical hop, and the path between the network control entity 194 and the network control entity 193 defines a single physical hop and a single logical hop. Thus, the control plane of the switch fabric system 100 can include multiple logical and physical hops. In some embodiments, the network control entity 194 can be said to be a route reflector (e.g., a Boarder Gateway Protocol (BGP) Route Reflector).

In some embodiments, the network control entities 191-193 can send forwarding-state information to the other network control entities 191-193 over the control plane using a targeted higher level protocol (e.g., an application layer protocol) such as, for example, a Boarder Gateway Protocol (BGP). In such embodiments, a network control entity 191-193 can use such a higher level protocol in conjunction with any suitable lower level protocol (e.g., a data link layer protocol), such as, for example, Ethernet and/or Fibre Channel, to send the forwarding-state information. Similarly stated, the control plane of the switch fabric system 100 can use a targeted higher level protocol (e.g., BGP) in conjunction with a packet-based lower level protocol (e.g., Ethernet). As such, BGP forwarding-state information can be encapsulated in an Ethernet frame and/or packet and sent to other network control entities over the control plane. Accordingly, in some embodiments, the control signals can be sent within the switch fabric system 100 using a packet-based protocol. Further, although BGP can be implemented at the application layer, it can be used to send forwarding-state information used to populate a routing table (e.g., stored at the network control entities 191-193) associated with a network layer and/or data link layer. Using a targeted protocol, such as BGP, a network control entity 191-193 can send the forwarding-state information to specific network control entities 191-193 while refraining from sending the forwarding-state information to other network control entities 191-193, as described in further detail herein.

In some embodiments, the network control entity 194 can store an address and/or identifier associated with the network control entities 191-193. In such embodiments, when a network control entity 191-193 has updated forwarding-state information to distribute, the network control entity 191-193 can send the updated forwarding-state information to the network control entity 194. Similarly stated, the network control entity 191-193 can send a forwarding-state packet using the packet-based protocol (e.g., Ethernet) and the targeted protocol (e.g., BGP) to the network control entity 194. The network control entity 194 can then send the forwarding-state information to the other network control entities 191-193.

In other embodiments, the network control entities 191-193 are directly coupled to each other within the control plane without a network control entity 194 acting as a route reflector. In such embodiments, the network control entities 191-193 can store an address and/or identifier associated with the other network control entities 191-193 and send updated forwarding-state information directly to the other network control entities 191-193 via the control plane.

In some embodiments, each network control entity 191-193 can be part of a network segment (e.g., a virtual local area network (VLAN), a virtual switch fabric, etc.). For example, network control entity 192 and network control entity 193 can be part of a first network segment, and network control entity 191 can be part of a second network segment. In such embodiments, each network control entity 191-193 sends forwarding-state information to the other network control entities within the same network segment but not to the network control entities 191-193 within another network segment. Accordingly, the network control entity 194 sends updated forwarding-state information received from a network control entity 191-193 to the other network control entities 191-193 associated with its network segment but not to the network control entities 191-193 within another network segment. As such, in the above example the network control entity 192 sends forwarding-state information to the network control entity 193 but not the network control entity 191. Accordingly, the ports 141, 142, 144 associated with the network control entity 191 (associated with the second network segment) do not send data to the ports 121-124, 131-134, 143 associated with the network control entities 192 and 193 (associated with the first network segment). In such embodiments, the higher level network control entities (e.g., network control entity 194) within the control plane of the switch fabric system 100 can be said to implement and/or enforce rules and/or policies associated with the network segments.

Returning to FIG. 1, the network management module 155 can be a process, application, virtual machine, and/or some other software module (executing in hardware) or a hardware module executed at the compute device 150. The network management module 155 can, for example, define network segments. Additionally, the network management module 155 can divide and/or partition the ports 121-124, 131-134, 141-144 of the access switches 120, 130, 140 into the groups of ports 181, 182, 183 to be managed by network control entities 191-193. As such, the network management module 155 can associate the group of ports 181 with the network control entity 191, the group of ports 182 with the network control entity 192 and the group of ports 183 with the network control entity 193. Additionally, the network management module 155 can also monitor an available processing capacity of each network control entity 191-194 and initiate and/or terminate network control entities 191-194 when the available processing capacity of a network control entity 191-194 crosses (e.g., falls below) a first threshold and/or crosses (e.g., exceeds) a second threshold. As such, the control plane of the switch fabric system 100 can expand and/or contract based on the processing requirements of the switch fabric system 100. Such expansion and contraction is further described in detail in co-pending U.S. patent application Ser. No. bearing 12/968,848, entitled "Methods and Apparatus for Dynamic Resource Management within a Distributed Control Plane of a Switch," filed on the same date, which is incorporated herein by reference in its entirety.

In some embodiments, the network management module 155 can store (e.g., in a memory) a configuration file associated with configuration information (e.g., port protocol information, network segment assignment information, port assignment information, peripheral processing device information, etc.) and/or associated with forwarding-state information (e.g., routing information, port identifiers, network segment identifiers, peripheral processing device identifiers, etc.) associated with the switch fabric system 100. The network management module 155 can send a portion of the configuration information and/or forwarding-state information associated with a group of ports 181, 182, 183 to the network control entities 191-193 via the control plane portion of the communications network 110. Similarly, the network management module 155 can send a portion of the configuration information and/or forwarding-state information associated with each network control entity 191-193 to the network control entity 194. For example, the network management module 155 can send a portion of the configuration file associated with the group of ports 181 to the network control entity 191. For another example, the network management module can send a portion of the configuration file associated with the network control entities 191-193 to the network control entity 194.

In some embodiments, the network management module 155 is not part of the same hierarchy as the network control entities 191-194 because it does not function to send and/or forward forwarding-state information between network control entities 191-193. Said another way, after the network management module initiates the network control entities 191-194, the network management module 155 does not participate in the transport of forwarding-state information between the network control entities 191-194. Accordingly, in such embodiments, the network management module 155 is not hierarchically removed from the network control entities 191-193 because it is not within a same hierarchy as the network control entities 191-194 (e.g., is not within the network control entity hierarchy, as described in further detail herein).

Figure 3:
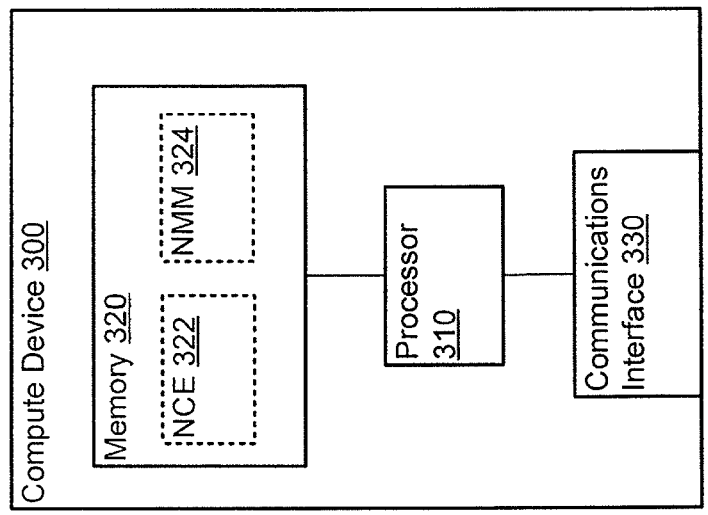
FIG. 3 is a schematic illustration of a compute device of a switch fabric system, according to another embodiment.

FIG. 3 is a system block diagram of a compute device 300 substantially similar to the compute device 150, according to an embodiment. Compute device 300 includes processor 310, memory 320, and communications interface 330. Processor 310 is operatively coupled to memory 320 and communications interface 330. Compute device 300 can communicate with other compute devices, peripheral processing devices and/or access switches via communications interface 330.

As illustrated in FIG. 3, compute device 300 can host a network control entity 322 and a network management module 324 similar to the network control entity 194 and the network management module 155, respectively, shown in FIG. 1. In other words, network control entity 322 and network management module 324 can be processes, applications, virtual machines, and/or some other software module (executing in hardware) or hardware module that is executed at compute device 300. In some embodiments, for example, instructions that implement network control entity 322 and/or network management module 324 can be stored at memory 320 and executed at processor 310.

In some embodiments, compute device 300 can be dedicated to hosting network control entity 322 and/or network management module 324. In other words, compute device 300 can allocate all or substantially all of its computing resources (e.g., processing capacity and memory) to network control entity 322 and/or network management module 324. In some embodiments, compute device 300 can host other processes, applications, virtual machines, and/or software modules in addition to network control entity 322 and/or network management module 324. For example compute device 300 can be a general purpose compute device or compute node that hosts multiple processes, applications, virtual machines, and/or software modules.

Returning to FIG. 1, the communications network 110 can be any suitable communications network that operatively couples the access switches 120, 130, 140 to the other access switches 120, 130, 140. Additionally, the communications network can operatively couple the compute device 150 to the access switches 120, 130, 140. In some embodiments, the communications network 110 includes a data plane portion and a control plane portion. The control plane portion of the communications network 110 facilitates transmission of control signals (e.g., configuration information, forwarding-state information, etc.) between the network control entities 191-194 and the network management module 155. Accordingly, the network control entities 191-194 can send configuration information and/or forwarding-state information to other network control entities 191-194 via the control plane portion of the communications network 110. In some embodiments, the control plane portion of the communications network 110 includes direct links between the network control entity 194 and the network control entities 191-193. In other embodiments, the control plane portion of the communications network 110 can include intermediate modules and/or switches to operatively couple the network control entities 191-193 with the network control entity 194.

The data plane portion of the communications network 110 facilitates transmission of data between access switches 120, 130, 140. In some embodiments, the data plane portion of the communications network 110 is a switch fabric having one or more stages. In some embodiments, for example, the data plane portion of the communications network 110 can be structurally and functionally similar to the switch fabric 400 shown and described with respect to FIG. 5. For example, the data plane portion of the communications network 110 can be a Clos switch fabric network (e.g., a non-blocking Clos network, a strict sense non-blocking Clos network, a Benes network) having multiple stages of switching modules (e.g., integrated cell-based switches). Such a switch fabric can include any number of stages. In some embodiments, for example, the switch fabric can include five, seven or nine stages. The data plane portion of the communications network 110 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the data plane portion of the communications network 110 can be (e.g., can function as) a single consolidated switch (e.g., a single large-scale consolidated L2/L3 switch). In other words, the data plane portion of the communications network 110 can operate as a single logical entity (e.g., a single logical network element). Similarly stated, the data plane portion of the communications network 110 can be part of a single logical hop between a first access switch 120, 130, 140 and a second access switch 120, 130, 140 (e.g., along with the data paths between the access switches 120, 130, 140 and the communications network 110). The data plane portion of the communications network 110 can couple (e.g., indirectly connect, facilitate communication between) the peripheral processing devices 171-175. In some embodiments, the communications network 110 can communicate via interface devices (not shown) operable to transmit data at a rate of at least 10 Gb/s. In some embodiments, the communications network 110 can communicate via interface devices (e.g., Fibre-Channel interface devices) operable to transmit data at a rate of, for example, 2 Gb/s, 4, Gb/s, 8 Gb/s, 10 Gb/s, 40 Gb/s, 100 Gb/s and/or faster link speeds.

Although the data plane portion of the communications network 110 can be logically centralized, the physical implementation of the data plane portion of the communications network 110 can be highly distributed, for example, for reliability. For example, portions of the data plane portion of the communications network 110 can be physically distributed across, for example, many chassis. In some embodiments, for example, a processing stage of the data plane portion of the communications network 110 can be included in a first chassis and another processing stage of the data plane portion of the communications network 110 can be included in a second chassis. Both of the processing stages can logically function as part of a single consolidated switch (e.g., within the same logical hop) but have a separate single physical hop between respective pairs of processing stages.

In use, the network management module 155 initiates network control entities 191-193 (by sending a signal to the access switches 120, 130, 140 via the control plane portion of the communications network 110, respectively) and, based on a processing capacity of the network control entities 191-193, assigns (e.g., using configuration information) each port 121-124, 131-134, 141-144 to a network control entity 191-193. As shown in FIG. 1, for example, the network management module 155 associates ports 121-124, 131 and 132 (group of ports 183) with the network control entity 193; ports 133, 134 and 143 (group of ports 182) with the network control entity 192; and ports 141, 142 and 144 (group of ports 183) with the network control entity 191.

The network management module 155 can also initiate one or more intermediary network control entities and/or route reflectors by sending a signal to an access switch 120, 130, 140 and/or a compute device 150 via the control plane portion of the communications network 110. For example, the network management module 155 can initiate network control entity 194 by sending a signal to another module (e.g., a control module) within the compute device 150. In other embodiments, the network management module 155 can initiate a route reflector at an access switch and/or another compute device by sending a signal to the other access switch or compute device via the control plane portion of the communication network 110. As shown and described above with respect to FIG. 4, each network control entity 191-193 can send control signals (i.e., signals within the control plane) to and receive control signals from the other network control entities 191-193 through network control entity 194 (e.g., over multiple physical and logical hops using a packet-based protocol). Additionally, as described in further detail herein, each network control entity 191-193 can store less forwarding-state information and/or routing information because the network control entity 194 can store some forwarding-state information and/or routing information in lieu of network control entities 191-193 maintaining all forwarding-state information and/or routing information. For example, each network control entity 191-193 does not store an address and/or identifier associated with the other network control entities 191-193 because the network control entity 194 stores such addresses and/or identifiers. As such, the network control entities 191-193 store an address and/or identifier associated with the network control entity 194 but not an address or identifier associated with the other network control entities 191-193. In some embodiments, the network management module 155 can also initiate one or more network segments by sending a signal to the portions of the switch fabric system 100 (e.g., the access switches 120, 130, 140, the network control entities 191-194, the route reflectors, etc.) to be associated with the network segments.

The network management module 155 can send configuration information and/or forwarding-state information (e.g., a configuration file) to each network control entity 191-194. In some embodiments, for example, each network control entity 191-193 can receive configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with its associated group of ports 181-183 from the network management module 155. For example, network control entity 191 can receive configuration information and/or forwarding-state information associated with the group of ports 181, network control entity 192 can receive configuration information and/or forwarding-state information associated with the group of ports 182 and network control entity 193 can receive configuration information and/or forwarding-state information associated with the group of ports 183. The network control entity 194 can receive configuration information and/or forwarding-state information associated with the network control entities 191-193. As such, the network control entity 194 can act as an intermediary and/or a route reflector (e.g., a BGP Route Reflector) between the network control entities 191-193. Accordingly, as described in further detail herein, the network control entity 194 can be said to be hierarchically removed from the network control entities 191-193 within a control plane hierarchy (e.g., at a different hierarchical level within a same hierarchy as the network control entities 191-193).

Each network control entity 191-193 can send initial and/or updated forwarding-state information to the other network control entities 191-193 when the forwarding-state associated with its group of ports 181-183 is initiated, changed and/or modified. For example, in response to the peripheral processing device 174 being initially coupled to the port 133, the network control entity 192 can send forwarding-state information associated with the port 133 and the destination peripheral processing device 174 to the network control entity 193. In other embodiments, the network control entity 192 can also send the forwarding-state information to the network control entity 191. Such forwarding-state information can be sent using a packet-based lower level protocol (e.g., Ethernet) in conjunction with a targeted higher level protocol (e.g., BGP). As such, BGP forwarding-state information can be encapsulated in an Ethernet frame and/or packet and sent to other network control entities over the control plane.

As shown in FIGS. 1 and 4, the network control entity 192 sends the forwarding-state information to the network control entity 194 via the path 167. Specifically, the network control entity 192 retrieves an identifier and/or address associated with the network control entity 194 (e.g., stored in a memory of the access switch 130) and sends the forwarding-state information accordingly. The path 167 can be said to be a single logical hop between the network control entity 192 and the network control entity 194. In some embodiments, the path 167 can also be said to be a single physical hop between the access switch 130 and the compute device 150.

The network control entity 194 can then send the forwarding-state-information to the network control entity 193. Specifically, the network control entity 194 determines that the forwarding-state information should be sent to the network control entity 193 (e.g., the network control entity 193 is part of a same network segment as the network control entity 192), retrieves an identifier and/or address associated with the network control entity 193 (e.g., stored in a memory of the compute device 150), and sends the updated forwarding-state information accordingly. As described in further detail herein, this allows peripheral processing device 171 to send data to peripheral processing device 174, which is coupled to access switch 130 and is managed by network control entity 192. Similar to the path 167, the path 166 can be said to be a single logical hop between the network control entity 194 and the network control entity 193. In some embodiments, the path 166 can also be said to be a single physical hop between the compute device 150 and the access switch 120. Accordingly, such a path 167, 166 between the network control entity 192 and the network control entity 193 can be said to include multiple physical hops and multiple logical hops. In particular, the path 167, 166 between the network control entity 192 and the network control entity 193 includes two physical hops and two logical hops (e.g., 166, 167) within the control plane of the switch fabric system 100, as shown in FIG. 4. Thus, the control plane can be said to be a multi-hop (i.e., both logically and physically) control plane.

In some embodiments, the network control entity 193 can store the forwarding-state information received from the network control entity 194 in a memory associated with the network control entity 193. For example, the network control entity 193 can store the forwarding-state information at the memory (e.g., memory 252) of the access switch 120 at which the network control entity 193 is located. Similarly stated, the network control entity 193 can update a configuration and/or forwarding-state table within the memory of the access switch 120 in response to receiving the forwarding-state information. In some embodiments, the forwarding-state information can be stored at a portion of the memory of the access switch 120 allocated and/or partitioned for the network control entity 193.

The network control entity 193 can then send the updated forwarding-state information to data plane modules (not shown in FIG. 1) at the access switches 120, 130 at which ports 121-124, 131, 132 associated with the network control entity 193 are located. In some embodiments, for example, the network control entity 193 can store the forwarding-state information at a portion of the memory (e.g., within a switching table and/or a routing table) of the access switch 120 allocated and/or partitioned for data, processes and/or applications associated with the data plane. In such embodiments, the memory of the access switch 120 can store the forwarding-state information in a portion of the memory associated with the network control entity 193 as well as in a portion of the memory associated with the data plane. In other embodiments, the forwarding-state information is stored within a single location within the memory of the access switch 120 accessible by the applicable processes at the access switch 120 (including the network control entity 193 and the data plane module). The network control entity 193 also sends the forwarding-state information to a data plane module at the access switch 130 (ports 131 and 132 at access switch 130 are associated with the network control entity 193). Similar to the access switch 120, the access switch 130 can store the forwarding-state information within a memory (e.g., within a switching table and/or a routing table).

A data packet (e.g., an Ethernet frame and/or packet) can be sent between peripheral processing devices 171-175 using remaining portions of the switch fabric system 100. For example, a data packet can be sent from a source peripheral processing device 171 to a destination peripheral processing device 174. The source peripheral processing device 171 can send the data packet to the access switch 120 through port 121 using a first data link layer protocol (e.g., a packet-based protocol such as, for example, Ethernet, Fibre Channel, etc.). This is shown by path 161 in FIG. 1.

Based on the forwarding-state information received from the network control entity 193, the access switch 120 can prepare the data packet to enter the communications network 110. In some embodiments, for example, the access switch 120 can add and/or append a header (e.g., encapsulate) to the data packet having a destination address of the peripheral processing device 174, the port 133 and/or the access switch 130. In some embodiments, the access switch 120 can also divide and/or partition the data packet into multiple data cells to be sent through the data plane portion of the communications network 110 to the access switch 130. In such embodiments, for example, the access switch 120 can divide and/or partition the data packet into multiple fixed-length data cells each containing a destination header (e.g., being encapsulated by a destination header) having a destination address of the peripheral processing device 174, a destination address of the port 133 and/or a destination address of the access switch 130.

The fixed-length data cells are sent to the access switch 130 through the data plane portion of the communications network 110 as illustrated by path 162. The data plane portion of the communications network 110 can route and/or forward the data cells based on the destination address of the peripheral processing device 174, the port 133 and/or the access switch 130. As such, the data plane portion of the communications network 110 can use a second data link layer protocol (e.g., a cell-based protocol), different than the first data link layer protocol (e.g., a packet-based protocol) used to send the data packet from the peripheral processing device 171 to the access switch 120. Accordingly, while each data cell can transverse multiple physical hops when in the communications network 110 (e.g., between stages of the multi-stage switch fabric), the path 162 between the access switch 120 and the access switch 130, from the perspective of the first data link layer protocol (e.g., the packet-based protocol), can be a single logical hop within the data plane portion of the communications network 110.

The access switch 130 can then prepare the data cells to be sent to the peripheral processing device 174 via the port 133 as shown by path 163. Such preparation can include removing a header (e.g., decapsulating the data cells) having the destination address of the peripheral processing device 174, the port 133 and/or the access switch 130 from the data cells (i.e., the header appended to the data cells by the access switch 120 and used by the data plane portion of the communications network 110 to route and/or forward the data). In some embodiments, such preparation can also include reconstructing and/or reassembling the data packet and/or frame from the data cells. More generally, the access switch 130 can prepare the data packet and/or frame to be sent to the peripheral processing device 174 using the first protocol (e.g., the packet-based protocol). After the data packet and/or frame is ready, the access switch 130 sends the data packet to the peripheral processing device 174 through port 133.

Figure 5:
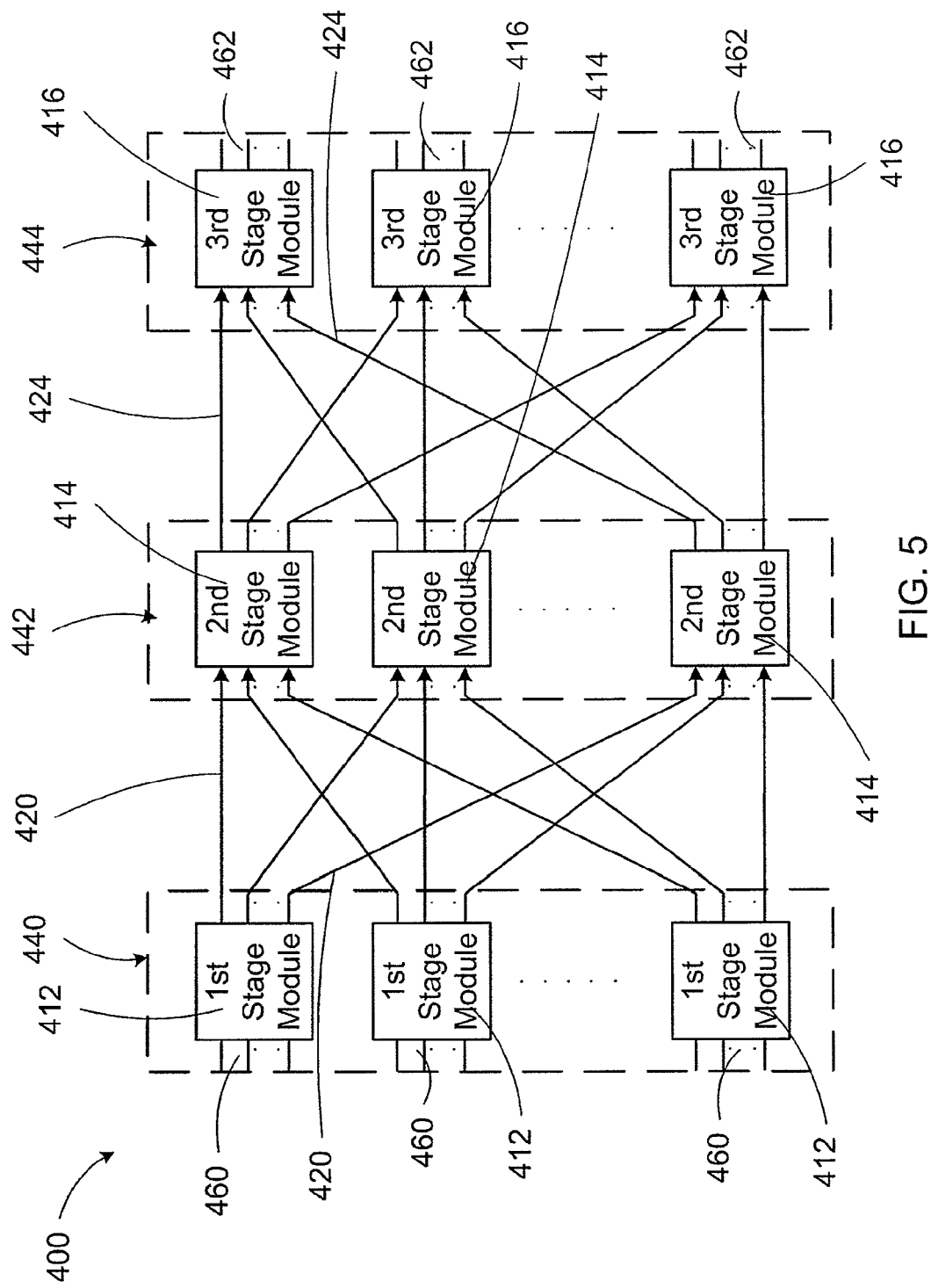
FIG. 5 is a schematic illustration of a switch fabric, according to another embodiment.

FIG. 5 is a schematic illustration of a switch fabric 400, according to an embodiment. Such a switch fabric can be structurally and functionally similar to the data plane portion of the communications network 110, shown and described above with respect to FIG. 1. The switch fabric 400 can define a core portion of a data center. Switch fabric 400 is a three-stage, non-blocking Clos network and includes a first stage 440, a second stage 442, and a third stage 444. The first stage 440 includes modules 412. Each module 412 of the first stage 440 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 412 of the first stage 440 is a switch (e.g., a packet switch, a frame switch, an integrated Ethernet switch and/or a cell switch). The switches are configured to redirect data (e.g., data packets, data cells, etc.) as it flows through the switch fabric 400. In some embodiments, for example, each switch includes multiple input ports operatively coupled to write interfaces on a memory buffer (not shown in FIG. 4). Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) or data packet per time period (e.g., one or more clock cycles) and all output ports to read one outgoing cell or data packet per time period. Each switch operates similar to a crossbar switch that can be reconfigured subsequent each time period.

Each module 412 of the first stage 440 includes a set of input ports 460 configured to receive data (e.g., a signal, a data cell, a data packet, etc.) as it enters the switch fabric 400. In some embodiments, for example, access switches can send data to the switch fabric 400 via the set of input ports 460. In this embodiment, each module 412 of the first stage 440 includes the same number of input ports 460.

Similar to the first stage 440, the second stage 442 of the switch fabric 400 includes modules 414. The modules 414 of the second stage 442 are structurally similar to the modules 412 of the first stage 440. Each module 414 of the second stage 442 is operatively coupled to each module 412 of the first stage 440 by a data path 420. Each data path 420 between a given module 412 of the first stage 440 and a given module 414 of the second stage 442 is configured to facilitate data transfer from the modules 412 of the first stage 440 to the modules 414 of the second stage 442.

The data paths 420 between the modules 412 of the first stage 440 and the modules 414 of the second stage 442 can be constructed in any manner configured to facilitate data transfer from the modules 412 of the first stage 440 to the modules 414 of the second stage 442. In some embodiments, for example, the data paths 420 are optical connectors between the modules. In other embodiments, the data paths are within a midplane. Such a midplane can be similar to that described in U.S. application Ser. No. 12/345,500, filed Dec.

49, 4008, and entitled "System Architecture for a Scalable and Distributed Multi-Stage Switch Fabric," which is incorporated herein by reference in its entirety. Such a midplane can be used to connect each module of the second stage with each module of the first stage. In still other embodiments, two or more modules are contained within a single chip package and the data paths are electrical traces.

In some embodiments, the switch fabric 400 is a non-blocking Clos network. Thus, the number of modules 414 of the second stage 442 of the switch fabric 400 varies based on the number of input ports 460 of each module 412 of the first stage 440. In a rearrangeably non-blocking Clos network (e.g., a Benes network), the number of modules 414 of the second stage 442 is greater than or equal to the number of input ports 460 of each module 412 of the first stage 440. Thus, if n is the number of input ports 460 of each module 412 of the first stage 440 and m is the number of modules 414 of the second stage 442, m≥n. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 444 of the switch fabric 400 includes modules 416. The modules 416 of the third stage 444 are structurally similar to the modules 412 of the first stage 440. The number of modules 416 of the third stage 444 is typically equivalent to the number of modules 412 of the first stage 440. Each module 416 of the third stage 444 includes output ports 462 configured to allow data to exit the switch fabric 400. Each module 416 of the third stage 444 includes the same number of output ports 462. Further, the number of output ports 462 of each module 416 of the third stage 444 is typically equivalent to the number of input ports 460 of each module 412 of the first stage 440. In some embodiments, for example, each module 416 of the third stage 444 can send data to the access switches via the output ports 462.

Each module 416 of the third stage 444 is connected to each module 414 of the second stage 442 by a data path 424. The data paths 424 between the modules 414 of the second stage 442 and the modules 416 of the third stage 444 are configured to facilitate data transfer from the modules 414 of the second stage 442 to the modules 416 of the third stage 444.

The data paths 424 between the modules 414 of the second stage 442 and the modules 416 of the third stage 444 can be constructed in any manner configured to facilitate data transfer from the modules 414 of the second stage 442 to the modules 416 of the third stage 444. In some embodiments, for example, the data paths 424 are optical connectors between the modules. In other embodiments, the data paths are within a midplane. Such a midplane can be used to connect each module of the second stage with each module of the third stage. In still other embodiments, two or more modules are contained within a single chip package and the data paths are electrical traces.

In some embodiments, the switch fabric 400 couples access switches (not shown in FIG. 5) as hierarchical peers. Specifically, the switch fabric 400 provides any-to-any connectivity between the access switches at relatively low latency. In some embodiments, the access switches can be said to be hierarchical peers with and/or on a same hierarchical level as the other access switches. As such, one access switch does not control and/or manage another access switch. Additionally, an access switch sends data to another access switch through a flat and/or non-hierarchical portion of the data plane of switch fabric 400.

In some embodiments, each module 412, 414, 416 within the switch fabric 400 uses a cell-based protocol to redirect and/or forward data through the switch fabric 400. For example, in some embodiments, an access switch operatively coupled to a module 412 of the first stage 440 divides and/or partitions a data packet and/or frame into multiple data cells. In some embodiments, each of the data cells includes a destination address and/or identifier associated with a destination port, a destination access switch and/or a destination peripheral processing device. The access switch can then send the data cells to the switch fabric 400. Using the destination address and/or identifier and a cell-based protocol, the switch fabric 400 can forward the data cells to the destination access switch.

Figure 6:
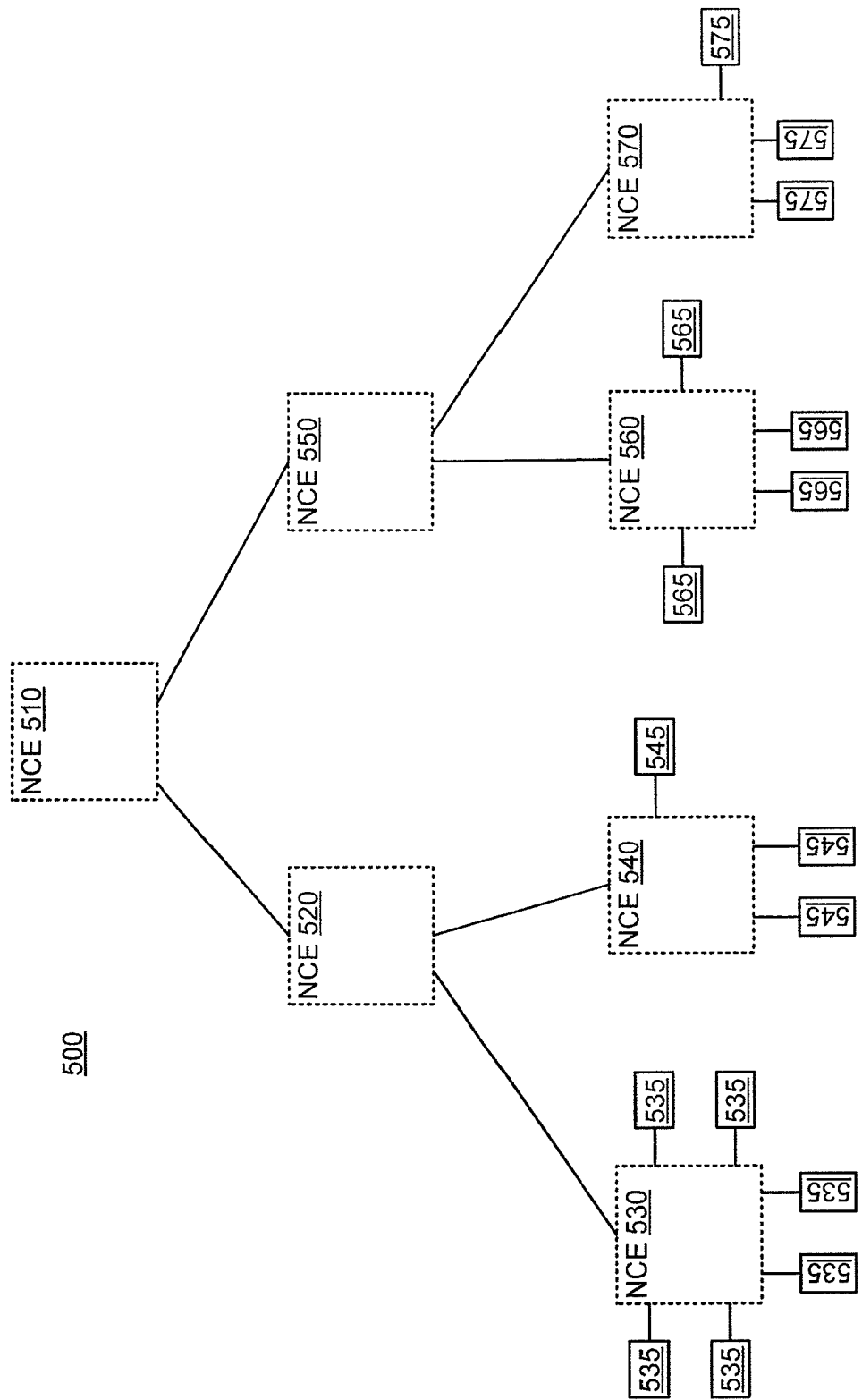
FIG. 6 is a schematic illustration of a hierarchical control plane of a switch fabric system, according to another embodiment.

FIG. 6 is a schematic illustration of a hierarchical control plane 500 of a switch fabric system, according to another embodiment. The control plane 500 includes multiple network control entities 510, 520, 530, 540, 550, 560, 570 arranged in a hierarchical manner. The network control entities 510, 520, 530, 540, 550, 560, 570 can be similar to the network control entities 191, 192, 193 shown and described above with respect to FIGS. 1-4. As such, each network control entity can be a process, application, virtual machine, and/or some other software module (executing in hardware) or a hardware module executed at an access switch (not shown in FIG. 6) or a compute device (not shown in FIG. 6).

Some network control entities 530, 540, 560 and 570 function and/or operate to manage and/or control one or more ports 535, 545, 565, 575. For example, network control entity 530 manages and/or controls the ports 535, network control entity 540 manages and/or controls the ports 545, network control entity 560 manages and/or controls the ports 565 and network control entity 570 manages and/or controls the ports 575.

Other network control entities 510, 520, 550 function and/or operate as route reflectors (e.g., BGP Route Reflectors). As such, the network control entities 510, 520, 550 can function as intermediary network control entities between the network control entities 530, 540, 560, 570. In some embodiments, the network control entities 510, 520, 550 can be said to be hierarchically removed (e.g., a different hierarchical level) from the network control entities 530, 540, 560, 570. For example, the network control entities 510, 520, 550 can be said to be on a higher hierarchical level in the control plane 500 than the network control entities 530, 540, 560, 570. More specifically, the network control entity 510 can be referred to as being at a top hierarchical level of the control plane 500, the network control entities 520, 550 can be referred to as being at an intermediate hierarchical level of the control plane 500, and the network control entities 530, 540, 560, 570 can be said to be at a bottom hierarchical level of the control plane 500.

Each network control entity 510, 520, 530, 540, 550, 560, 570 can store an address and/or an identifier associated with the network control entities 510, 520, 530, 540, 550, 560, 570 with which it is directly coupled. Similarly stated, each network control entity 510, 520, 530, 540, 550, 560, 570 can store an address and/or identifier associated with the network control entities 510, 520, 530, 540, 550, 560, 570 coupled to that network control entity 510, 520, 530, 540, 550, 560, 570 by a single logical hop.

For example, the network control entity 510 can store an address and/or identifier associated with the network control entities 520 and 550. Similarly stated, the network control entity 510 can act and/or function as a route reflector between the network control entity 520 and the network control entity 550. Accordingly, when the network control entity 510 receives forwarding-state information to be sent to the network control entity 560, for example, the network control entity 510 addresses and sends the forwarding-state information to the network control entity 550. Similarly, when the network control entity 510 receives forwarding-state information to be sent to the network control entity 530, for example, the network control entity 510 addresses and sends the forwarding-state information to the network control entity 520. In some embodiments, the network control entity 520 does not store an address and/or identifier associated with the network control entities 530, 540, 560, 570. In this case, the network control entity 520 stores address and/or identifier information for network control entities 530 and 540, and the network control entity 550 stores address and/or identifier information for network control entities 560 and 570.

For another example, the network control entity 520 can store an address and/or identifier associated with the network control entities 510, 530 and 540. Accordingly, when the network control entity 520 receives forwarding-state information to be sent to the network control entity 560, for example, the network control entity 520 addresses and sends the forwarding-state information to the network control entity 510. Similarly, when the network control entity 520 receives forwarding-state information to be sent to the network control entity 530, for example, the network control entity addresses and sends the forwarding-state information directly to the network control entity 530. In this case, the network control entity 520 stores address and/or identifier information for network control entities 530, 540 and 510, but not network control entities 550, 560 or 570.

For yet another example, the network control entity 540 can store an address and/or identifier associated with the network control entity 520. Accordingly, when the network control entity 520 has forwarding-state information to be sent to one of the network control entities 530, 560 or 570, for example, the network control entity 540 addresses and sends the forwarding-state information to the network control entity 520. In this case, the network control entity 540 stores address and/or identifier information for the network control entity 520, but not network control entities 510, 530, 550, 560 or 570.

In some embodiments, each network control entity 510, 520, 530, 540, 550, 560, 570 does not store an address and/or an identifier associated with network control entities 510, 520, 530, 540, 550, 560, 570 with which it is not directly coupled. In such embodiments, for example, network control entity 510 does not store an address and/or an identifier associated with the network control entities 530, 540, 560, and 570. Similarly, in such embodiments, network control entity 530 does not store an address and/or an identifier associated with the network control entities 510, 540, 550, 560, and 570. In such embodiments, the network control entities 510, 520 and 550 each operate as a route reflector for the lower one hierarchical level. In other embodiments, each network control entity 510, 520, 530, 540, 550, 560, 570 also stores an address and/or an identifier associated with network control entities 510, 520, 530, 540, 550, 560, 570 with which it is not directly coupled.

Figure 7:
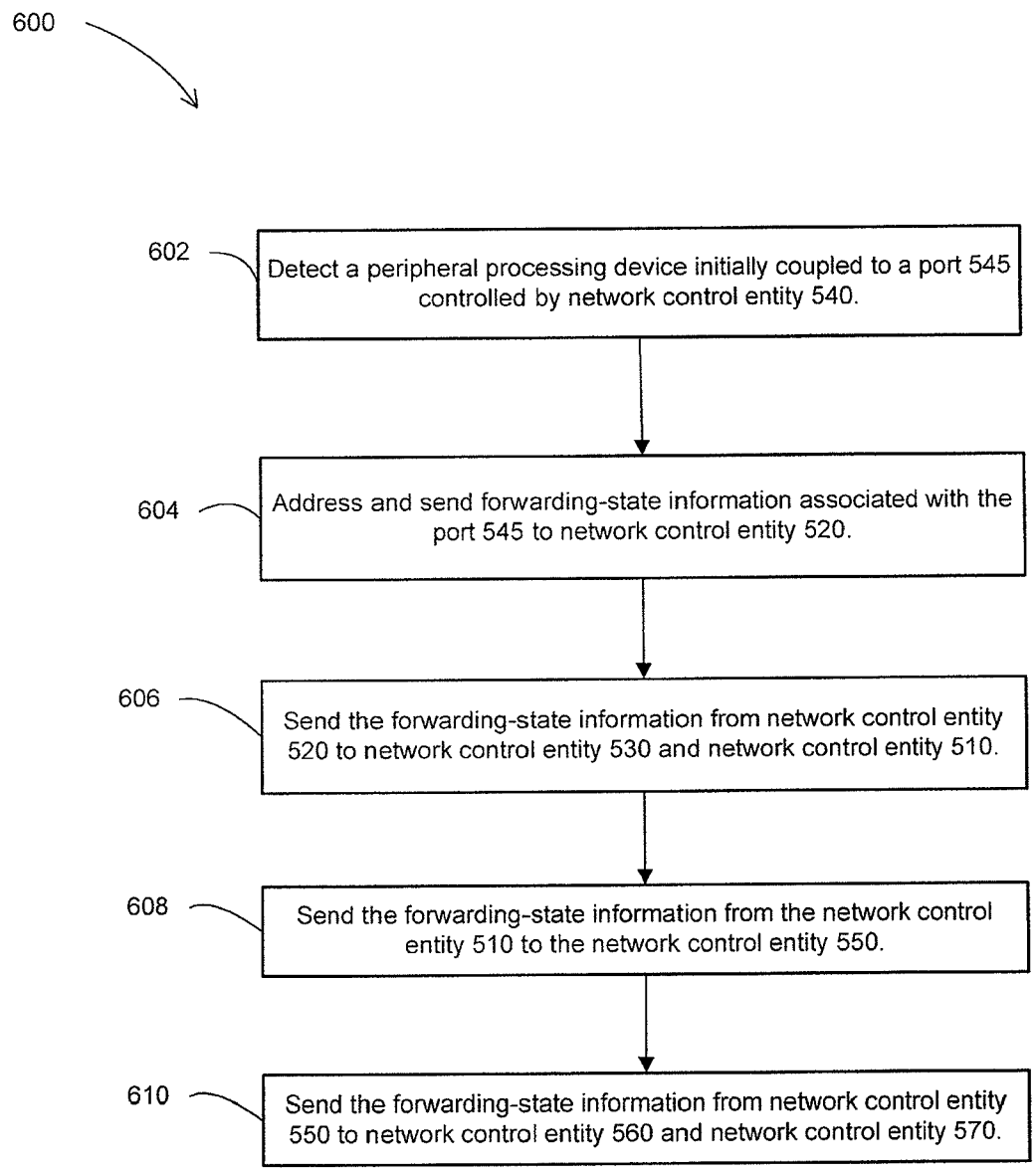
FIG. 7 is a flow chart illustrating a method of sending forwarding-state information via the hierarchical control plane of the switch fabric system of FIG. 6.

In use, a network control entity 530, 540, 560, 570 can send updated forwarding-state information to another network control entity 530, 540, 560, 570 via one or more intermediate and/or higher level network control entities 510, 520, 550. FIG. 7 is a flow chart illustrating a method 600 of sending forwarding-state information via the hierarchical control plane of the switch fabric system of FIG. 6. For example, network control entity 540 can detect when a peripheral processing device is initially coupled to one of the ports 545, at 602. The network control entity 540 can then send the updated forwarding-state information (e.g., the forwarding-state information associated with that port 545) to the other network control entities 530, 560, 570 in a same network segment. Specifically, the network control entity 540 can address and send the forwarding-state information to the network control entity 520, at 604. The network control entity 520 can then send the forwarding-state information to the network control entity 530 (which can store the forwarding-state information) and the network control entity 510, at 606. The network control entity 510 can send and/or distribute the forwarding-state information to the network control entity 550, at 608, which can send the forwarding-state information to the network control entities 560 and 570, at 610. Accordingly, using a hierarchical control plane, the network control entities 530, 540, 560, 570 can send forwarding-state information to the other network control entities 530, 540, 560, 570 without storing an address and/or an identifier associated with every other network control entity 530, 540, 560, 570.

In some embodiments, not every network control entity 530, 540, 560, 570 is part of the same network segment. In such embodiments, the network control entities 510, 520, 550 can enforce rules and/or policies associated with the various network segments. For example, the network control entity 560 can be associated with a first network segment and the network control entity 570 can be associated with a second network segment. In such an example, the network control entity 550 can send forwarding-state information originating from another network control entity associated with the first network segment to the network control entity 560 but not to the network control entity 570. Similarly, the network control entity 550 can send forwarding-state information originating from another network control entity associated with the second network segment to the network control entity 570 but not to the network control entity 560. For another example, the network control entity 510 and/or the network control entity 520 can send forwarding-state information originating from a network control entity associated with the first network segment to the other network control entities associated with the first network segment but not the to the network control entities associated with the second network segment. As such, the network control entity 510 can send forwarding-state information originating from network control entity 560 to the network control entity 520 if at least one of the network control entities 530, 540 is also associated with the first network segment. Similarly, the network control entity 510 can refrain from sending forwarding-state information originating from network control entity 560 to the network control entity 520 if neither of the network control entities 530, 540 is associated with the first network segment. Such network segments can be similar to the network segments shown and described in co-pending U.S. patent application Ser. No. bearing 12/969,277, entitled "Methods and Apparatus for Forwarding-State Transport in a Distributed Control Plane," filed on the same date, which is incorporated herein by reference in its entirety.

In some embodiments, the forwarding-state information is transmitted between the network control entities using a targeted higher level protocol (e.g., an application layer protocol) such as, for example, a Boarder Gateway Protocol (BGP). In such embodiments, a network control entity 510, 520, 530, 540, 550, 560, 570 can use such a higher level protocol in conjunction with any suitable lower level protocol (e.g., a data link layer protocol), such as, for example, Ethernet and/or Fibre Channel, to send the forwarding-state information. Similarly stated, the control plane 500 can use a targeted higher level protocol (e.g., BGP) in conjunction with a packet-based lower level protocol (e.g., Ethernet). As such, BGP forwarding-state information can be encapsulated in an Ethernet frame and/or packet and sent to other network control entities over the control plane. Accordingly, in some embodiments, the control signals can be sent within the control plane 500 using a packet-based protocol. Using a targeted protocol, such as BGP, a network control entity 510, 520, 530, 540, 550, 560, 570 can send the forwarding-state information to specific network control entities 510, 520, 530, 540, 550, 560, 570 while refraining from sending the forwarding-state information to other network control entities 510, 520, 530, 540, 550, 560, 570 (e.g., within a different network segment).

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software (executing on hardware) to perform computations on relatively heavy network workloads. In some embodiments, the services nodes can perform computations on a per packet basis in a relatively efficient fashion (e.g., more efficiently than can be performed at, for example, a compute node). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices operable to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, a switch fabric system can include any suitable number of route reflectors.

What is claimed is:

1. An apparatus, comprising:
a first compute device configured to:
(1) communicate with a network control entity at each access switch from a plurality of access switches that define a portion of a data plane having a switch fabric coupling, as hierarchical peers, each access switch from the plurality of access switches, the switch fabric operable to use a cell-based protocol to route data from a first access switch from the plurality of access switches to a second access switch from the plurality of access switches, a data path within the data plane between the first access switch and the second access switch including a single logical hop;
(2) define a portion of a distributed control plane that includes the network control entities from the plurality of access switches such that the first compute device is hierarchically removed from the network control entities from the plurality of access switches, the distributed control plane configured to include a second compute device at a same hierarchical level within the distributed control plane as the first compute device, a control packet path within the distributed control plane between the first access switch and the second access switch including multiple logical hops;
(3) receive forwarding-state information from the first access switch from the plurality of access switches using a packet-based protocol and via a first logical hop from the multiple logical hops; and
(4) send the forwarding-state information to the second access switch from the plurality of access switches using the packet-based protocol and via a second logical hop from the multiple logical hops, the network control entity at the first access switch from the plurality of access switches sending the forwarding-state information to the network control entity at the second access switch from the plurality of access switches without storing an identifier associated with the network control entity at the second access switch.

2. The apparatus of claim 1, further comprising:
the network control entity at the first access switch from the plurality of access switches, the network control entity at the first access switch operable to manage a first port located at the first access switch and a second port located at a third access switch from the plurality of access switches.

3. The apparatus of claim 1, wherein the first compute device is operable to manage the network control entity at the first access switch and the network control entity at the second access switch.

4. The apparatus of claim 1, wherein the network control entity at the first access switch from the plurality of access switches is operable to send forwarding-state information to the network control entity at the second access switch from the plurality of access switches via the first compute device and the second compute device.

5. An apparatus, comprising:
a first control plane device configured to:
(1) communicate, via a distributed control plane, with each access switch from a plurality of access switches coupled together as hierarchical peers by a switch fabric defining a single logical hop within a data plane, the switch fabric operable to use a cell-based protocol to route data from a first access switch from the plurality of access switches to a second access switch from the plurality of access switches, a data path within the data plane between the first access switch and the second access switch including a single logical hop, the distributed control plane configured to include network control entities from the plurality of access switches such that the first control plane device is hierarchically removed from the network control entities from the plurality of access switches, the distributed control plane configured to include a second control plane device at a same hierarchical level within the distributed control plane as the first control plane device, a control packet path within the distributed control plane between the first access switch and the second access switch including multiple logical hops;
(2) receive forwarding-state information from the first access switch from the plurality of access switches using a packet-based protocol and via a first logical hop from the multiple logical hops; and
(3) send the forwarding-state information to the second access switch from the plurality of access switches using the packet-based protocol and via a second logical hop from the multiple logical hops, a network control entity at the first access switch from the plurality of access switches sending the forwarding-state information to a network control entity at the second access switch from the plurality of access switches without storing an identifier associated with the network control entity at the second access switch.

6. The apparatus of claim 5, further comprising:
the data plane, the data plane including a plurality of physical hops between the first access switch and the second access switch.

7. The apparatus of claim 5, further comprising:
the first access switch from the plurality of access switches, the first access switch is operable to partition a data packet into a plurality of data cells prior to sending the data packet to the second access switch from the plurality of access switches via the data plane.

8. The apparatus of claim 5, further comprising:
a switch fabric within the data plane, each access switch from the plurality of access switches being operatively coupled to the switch fabric, the switch fabric being part of the single logical hop between the first access switch and the second access switch.

9. The apparatus of claim 5, further comprising:
the first access switch from the plurality of access switches, the first access switch being operatively coupled to a peripheral processing device, the first access switch operable to receive data from the peripheral processing device using the packet-based protocol, the first access switch operable to send data to the second access switch via the data plane using the cell-based protocol.

10. The apparatus of claim 5, further comprising:
the network control entity at the first access switch operable to manage a first port located at the first access switch and a second port located at a third access switch from the plurality of access switches.

11. A system, comprising:
a data plane including a plurality of access switches and a switch fabric operatively coupling, as hierarchical peers, each access switch from the plurality of access switches, a first access switch from the plurality of access switches configured to send data to a second access switch from the plurality of access switches using a cell-based protocol, the switch fabric operable to use the cell-based protocol to route the data from the first access switch to the second access switch, a data path within the data plane between the first access switch and the second access switch including a single logical hop; and a distributed control plane including a network control entity at the first access switch from the plurality of access switches, a network control entity at the second access switch from the plurality of access switches and a first compute device, the network control entity at the first access switch to send forwarding-state information to the network control entity at the second access switch using a packet-based protocol via the first compute device and without storing an identifier associated with the network control entity at the second access switch, the first compute device being hierarchically removed from the network control entity at the first access switch and the network control entity at the second access switch, the distributed control plane configured to include a second compute device at a same hierarchical level within the distributed control plane as the first compute device, a control packet path within the distributed control plane between the network control entity at the first access switch and the network control entity at the second access switch including a first logical hop from multiple logical hops and a second logical hop from the multiple logical hops.

12. The system of claim 11, wherein the first access switch is operatively coupled to a peripheral processing device operable to send data to the first access switch using the packet-based protocol.

13. The system of claim 11, wherein the first access switch from the plurality of access switches is operable to partition a data packet into a plurality of data cells prior to sending the data packet to the second access switch from the plurality of access switches via the data plane.

14. The system of claim 11, wherein the distributed control plane defines the first logical hop from the multiple logical hops between the network control entity at the first access switch and the first compute device and the second logical hop from the multiple logical hops between the network control entity at the second access switch and the first compute device, the network control entity at the first access switch to send forwarding-state information to the network control entity at the second access switch via the first logical hop and the second logical hop.

* * * * *